United States Patent
Häussler

(10) Patent No.: US 11,053,710 B2
(45) Date of Patent: Jul. 6, 2021

(54) LOCKING DEVICE

(71) Applicant: Euchner GmbH + Co. KG, Leinfelden-Echterdingen (DE)

(72) Inventor: Johannes Häussler, Bad Boll (DE)

(73) Assignee: Euchner GmbH + Co. KG, Leinfelden-Echterdingen (DE)

( * ) Notice: Subject to any disclaimer, the term of this patent is extended or adjusted under 35 U.S.C. 154(b) by 709 days.

(21) Appl. No.: 15/917,579

(22) Filed: Mar. 10, 2018

(65) Prior Publication Data

US 2018/0266147 A1    Sep. 20, 2018

(30) Foreign Application Priority Data

Mar. 17, 2017   (EP) ..................... 17161677

(51) Int. Cl.
    *E05B 47/00*     (2006.01)
    *E05C 1/00*     (2006.01)
    (Continued)

(52) U.S. Cl.
    CPC ........ *E05B 47/0012* (2013.01); *E05B 47/026* (2013.01); *E05C 1/002* (2013.01);
    (Continued)

(58) Field of Classification Search
    CPC ............... E05B 47/0012; E05B 47/026; E05B 2047/0017; E05B 2047/0022; E05B 2047/0023; E05B 2047/0036; E05B 2047/0069; E05B 2047/0081; E05B 65/00; E05B 65/10; E05B 2015/023; Y10T 292/0982; Y10T 292/1021; Y10T 292/175; Y10T 292/18; Y10T 292/68; Y10T 292/696; Y10T 292/699; Y10T 292/096; Y10T 292/0969; Y10T 292/0976; Y10T 292/0977; Y10T 292/098; Y10T 70/7051; Y10T 70/7062; Y10T 70/7068; Y10T 70/7102; Y10T 70/7107; Y10T 70/7113; Y10T 70/7119; Y10T 70/5611; H01H 3/161; H01H 3/227; H01H 3/20;
    (Continued)

(56) References Cited

U.S. PATENT DOCUMENTS

| 8,686,869 B2 * | 4/2014 | Sharma ................. G01D 5/268 340/686.2 |
| 8,814,233 B2 * | 8/2014 | Leska ...................... F16P 3/10 292/341.16 |

FOREIGN PATENT DOCUMENTS

| DE | 3049091 A1 | 7/1982 |
| DE | 9011080 U1 | 1/1991 |

(Continued)

OTHER PUBLICATIONS

Computer Generated Translation for WO2016/058718A1, Generated on Dec. 16, 2020, https://worldwide.espacenet.com/ (Year: 2020).*

*Primary Examiner* — Alyson M Merlino
(74) *Attorney, Agent, or Firm* — Michael Soderman

(57) ABSTRACT

A guard locking element (4) actuatable by means of an electric drive (6). By means of the electric drive (6), the guard locking element (4) can be brought into a blocking position such that an actuator (2) of a safety switch is locked by said guard locking element. The guard locking element (4) is connected to the electric drive (6) by means of a coupling (11) such that a rotary motion of the electric drive (6) is converted into a purely translatory motion of the guard locking element (4).

16 Claims, 4 Drawing Sheets

(51) Int. Cl.
*E05B 15/02* (2006.01)
*E05B 65/00* (2006.01)
*E05B 47/02* (2006.01)
*E05C 1/08* (2006.01)
*G06K 7/10* (2006.01)

(52) U.S. Cl.
CPC ............ *E05C 1/08* (2013.01); *G06K 7/10366* (2013.01); *E05B 65/00* (2013.01); *E05B 2015/023* (2013.01); *E05B 2047/0017* (2013.01); *E05B 2047/0022* (2013.01); *E05B 2047/0023* (2013.01); *E05B 2047/0036* (2013.01); *E05B 2047/0069* (2013.01); *E05B 2047/0081* (2013.01); *E05Y 2201/434* (2013.01); *E05Y 2201/72* (2013.01); *E05Y 2900/132* (2013.01)

(58) Field of Classification Search
CPC .... H01H 3/022; H01H 13/183; H01H 21/282; H01H 27/007; H01H 27/002; H01H 27/00; E05C 1/002; E05C 1/08
See application file for complete search history.

(56) References Cited

FOREIGN PATENT DOCUMENTS

| | | | | |
|---|---|---|---|---|
| DE | 9403769 | U1 * | 4/1994 | ........... E05B 53/003 |
| EP | 2679750 | A1 | 1/2014 | |
| EP | 3029226 | A1 | 6/2016 | |
| WO | 8704213 | A1 | 7/1987 | |
| WO | 2015028106 | A1 | 3/2015 | |
| WO | WO-2015028106 | A1 * | 3/2015 | ........... H01H 27/007 |
| WO | WO-2016058718 | A1 * | 4/2016 | ......... E05B 47/0012 |

* cited by examiner

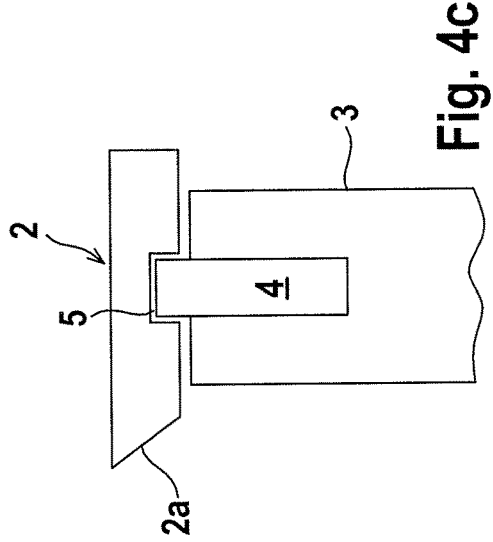
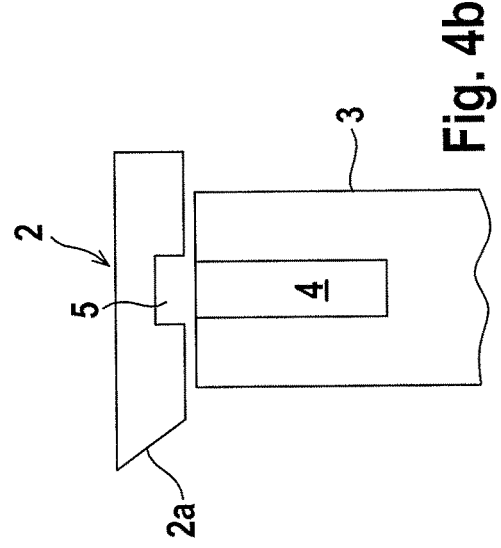
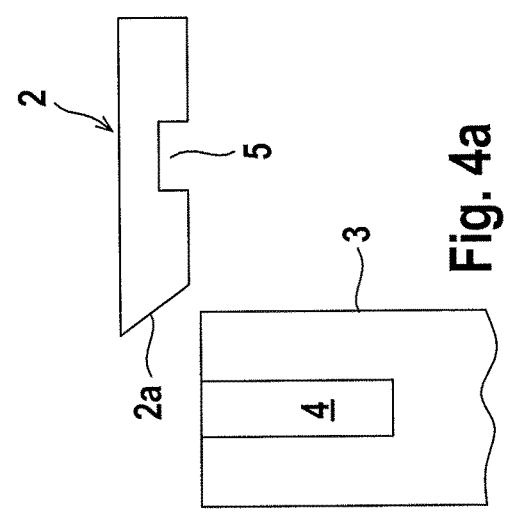
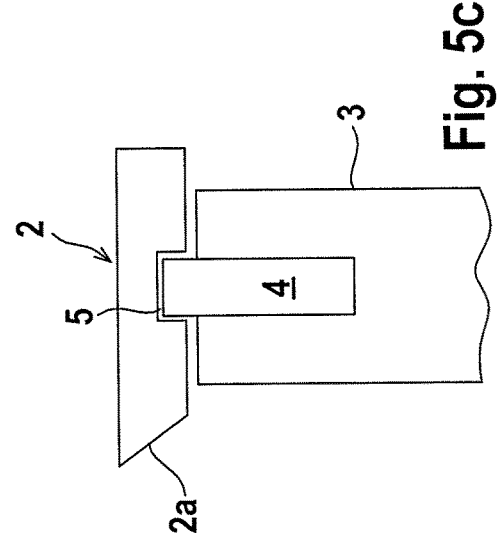
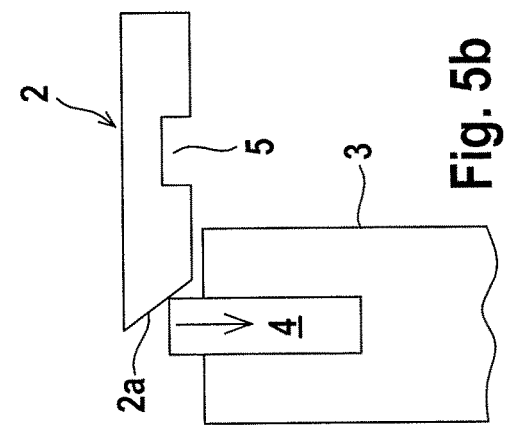
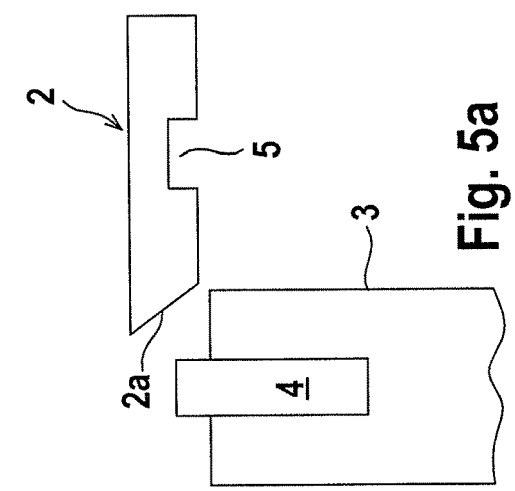

LOCKING DEVICE

CROSS REFERENCE TO RELATED APPLICATIONS

This application claims the priority of EP 17161677.4 filed on 2017 Mar. 17; this application is incorporated by reference herein in its entirety.

BACKGROUND

The invention concerns a guard locking device pursuant to the preamble of claim 1.

It is known that in the safety technology sphere, safety switches are used for guarding accesses to hazardous areas. For example, a safety switch can be used to lock a safety door used as an access to a hazardous area. The operation of a hazardous system within the hazardous area will not be released by a safety control unit unless the safety door has been locked by the safety switch. In this case, an actuator is assigned to the safety switch. Typically, the actuator may be arranged on the safety door while the safety switch is arranged on the frame delimiting the door opening.

For locking the safety door when the safety door is in its closed position, the actuator will be brought into engagement with the safety switch by, for example, inserting the actuator into a recess. This locking process is controlled by the fact that an RFID reader in the safety switch detects a transponder in the actuator.

In addition to this locking process, guard locking of the safety door may be provided. Such a guard locking device is known, for example, from WO 2016/058718 A1. In this guard locking device, a guard locking bolt is provided that is actuated by means of an electric motor having a planetary gear train. By means of the electric drive, the guard locking bolt can be moved into a blocking position in which the actuator is locked by means of the guard locking bolt.

SUMMARY

The invention concerns a guard locking element (4) actuatable by means of an electric drive (6). By means of the electric drive (6), the guard locking element (4) can be brought into a blocking position such that an actuator (2) of a safety switch is locked by said guard locking element. The guard locking element (4) is connected to the electric drive (6) by means of a coupling (11) such that a rotary motion of the electric drive (6) is converted into a purely translatory motion of the guard locking element (4).

DETAILED DESCRIPTION

The invention is based on the problem of providing a guard locking device of the aforementioned type that has a high level of functionality.

For resolving this problem, the features of claim 1 are provided. Advantageous embodiments and useful further developments of the invention are described in the dependent claims.

The invention concerns a guard locking element actuatable by means of an electric drive. By means of the electric drive, the guard locking element can be brought into a blocking position such that an actuator of a safety switch is locked by the guard locking element. The guard locking element is connected to the electric drive via a coupling such that a rotary motion of the electric drive is converted into a purely translatory motion of the guard locking element.

The guard locking device pursuant to the invention guarantees secure and reliable guard locking of the actuator of a safety switch. An essential aspect of the invention consists of the fact that, by means of the coupling and preferably a spindle nut on a spindle driven by an electric drive, the rotary motion of the electric drive is converted into a purely translatory motion of the guard locking element. This means that when actuating motions of the guard locking element are performed, in which the guard locking element is moved between a blocking position and a release position, no interfering rotary movement of the guard locking element is superimposed on the stroke motion. It is further advantageous that by means of the guard locking device pursuant to the invention, a large stroke of the guard locking element, and thus also strong guard locking forces, can be realized so that even for different embodiments of actuators and guard locking elements, reliable guard locking can be achieved.

By means of the guard locking device pursuant to the invention, bistable guard locking can be implemented. By means of the electric drive, the guard locking element can be moved into the blocking position. In this blocking position, the guard locking element engages with a recess on the actuator, thus effecting the guard locking. The guard locking element can be retracted again from the blocking position by means of the electric drive.

In this bistable guard locking device, the motion control of the guard locking element is completely performed via the electric drive. In order to be able to lock the actuator by means of the guard locking element, the guard locking element is first moved into its release position by means of the electric drive so that the actuator, with its recess, can be freely brought into the range of the guard locking element. Then, by means of the electric drive, the guard locking element is moved into the blocking position, thus bringing about the locking.

The functionality of the guard locking device pursuant to the invention is further expanded by the fact that the guard locking device has means of decoupling, by means of which the guard locking element, when decoupled from the electric drive, is movable out of the blocking position against the force of a spring.

This makes mechanical release of the guard locking device possible, which means that the device can be used for an escape release such that, if for example a safety door blocking the access to a hazardous area is locked by the guard locking device, a person present in the hazardous area can manually unlock the safety door in order to be able to leave the hazardous area. Generally, the mechanical release is also operable from the outside of the safety door, i.e. by a person outside of the hazardous area, in order to perform an auxiliary release in the visual range of the respective safety device, or to effect an emergency release of the safety door.

Pursuant to a particularly advantageous embodiment of the invention, the means of decoupling are used for realizing a capture function.

Here, the capture function is realized by the fact that the guard locking element is moved mechanically, and decoupled from the electric drive, out of a blocking position by means of an engagement element of the actuator. When the recess on the actuator lies within the range of the guard locking element, the latter is moved back by the spring force into the blocking position, and engages with the recess of the actuator.

This capture function constitutes an alternative to the bistable guard locking. Contrary to the bistable guard locking, in the capture function the motion of the guard locking element is not completely controlled by the electric drive. Instead, the means of decoupling are also used for mechanical decoupling.

Particularly advantageously, the guard locking device is optionally operable with bistable guard locking or a capture function.

Here, the functionality of the bistable guard locking or the capture function is defined by a software version of the guard locking device, or it can be specified by means of a programming command.

This considerably increases the functionality of the guard locking device pursuant to the invention.

Pursuant to an advantageous embodiment of the invention, the coupling has a cross pin, and a cylindrical pin oriented perpendicularly to the latter, with the cross pin being guided in a longitudinal guide and the cylindrical pin securing the cross pin.

The coupling embodied in such a manner has a very simple design with few parts.

Here, particularly advantageously, a torsionally rigid and play-free coupling is effected in the axial direction with the coupling between the guard locking element and the electric drive. In the lateral direction, tolerance compensation between these units is effected.

For this purpose, the longitudinal axes of the cross pin and of the cylindrical pin run perpendicular to the longitudinal axis of the guard locking element, with the cross pin being seated with play in a recess of the guard locking element, and with the cylindrical pin being seated with play in a recess of the cross pin.

Thanks to the play-free and torsionally rigid coupling between the electric drive and the guard locking element, exact and reproducible actuating motion of the guard locking element is achieved. This advantage is combined with the additional advantage of lateral tolerance compensation, which is effected by means of the coupling. This makes the guard locking pursuant to the invention resistant to unavoidable component tolerances, thus increasing the functional reliability of the guard locking device.

Pursuant to a useful design embodiment, the electric drive has an electric motor with a planetary gear train. On its output side, the electric drive is provided with a spindle that, due to the rotary motion of the electric drive, performs a forward motion that is translated to a driver coupled to the spindle by means of a spindle nut, said driver being connected to the guard locking element via the coupling.

The driver is connected to the coupling by means of the cylindrical pin, and is thus secured against forward motion.

The thusly embodied guard locking device has a compact, robust design.

Here, it is advantageous that the driver is embodied to be a hollow cylinder, with the interior of the driver embodying a decoupling path as an integral part of the means of decoupling, with the spindle being guidable along the decoupling path.

In addition, a spring that generates the spring force is seated between the driver and the decoupling means.

This allows mechanical decoupling of the guard locking with little design effort.

Pursuant to an advantageous embodiment, a cable is guided within the guard locking element, with a cable deflection device, by means of which the cable is positively guided along a trajectory, being arranged on the guard locking element.

Here, the cable is connected to a sensing means integrated in the guard locking element for controlling the locking.

Furthermore, the cable emerging at the cable deflection device is guided laterally next to the components of the guard locking device.

The cable deflection device is used as a simple means to securely prevent the cable from kinking or being otherwise damaged as it is being guided out of the range of the guard locking element. Because the cable emerging from the guard locking element runs at a distance next to the other components of the guard locking device, this prevents the cable in a simple manner from engaging with these components or from kinking when the guard locking element moves.

It is further advantageous that the guard locking element can be brought into a lower end position corresponding to a release position, which can be controlled by means of sensors.

This makes a sensor-controlled guard locking possible, with the guard locking element being moved, under sensor control, between the end positions defining the blocking position and the release position.

Here it is particularly advantageous that the guard locking element can be brought into a lower end position corresponding to a release position, which can be controlled by means of sensors. This defines the lower position of the spindle nut. Proceeding therefrom, the additional positions of the spindle nut are defined by means of a rotary position transducer of the electric drive.

BRIEF DESCRIPTION OF THE DRAWINGS

The invention is explained below based on the drawings. They show:

FIGS. 4a-c Sequence diagram for bistable guard locking with the guard locking device pursuant to FIG. 1.

FIGS. 5a-c Sequence diagram for a capture function with the guard locking device pursuant to FIG. 1.

DETAILED DESCRIPTION OF THE PREFERRED EMBODIMENTS

Figure 1:
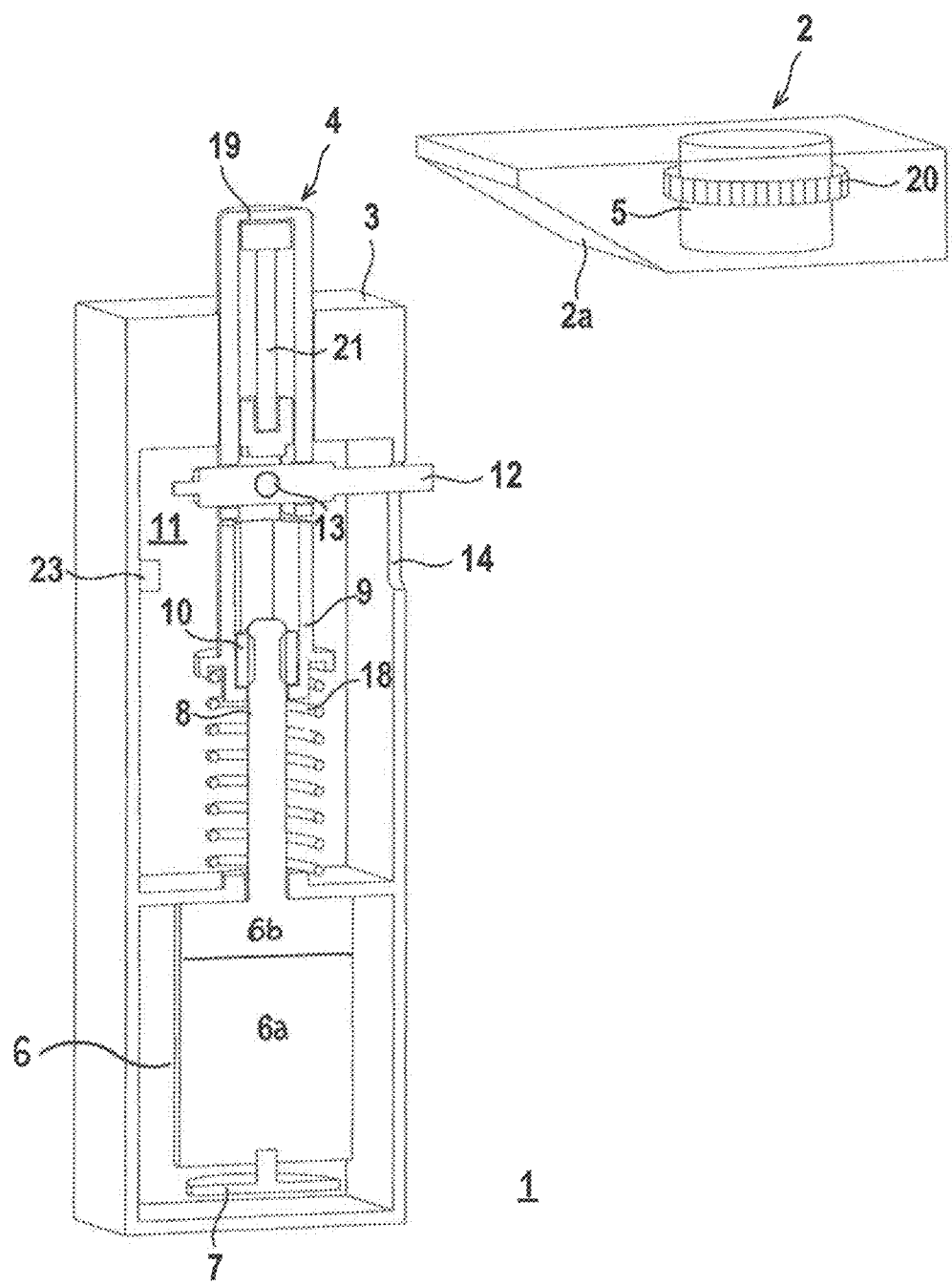
FIG. 1 Schematic representation of an exemplary embodiment of the guard locking device pursuant to the invention.

FIG. 1 shows an exemplary embodiment of guard locking device 1 pursuant to the invention. The guard locking device 1 is used to lock an actuator 2 that is an integral part of a safety device with a safety switch (not shown).

By means of this safety device, it is possible, for example, to secure a safety door as an access to a hazardous area. Actuator 2 can be arranged on the safety door and the safety switch can be arranged on a frame delimiting the door opening, which is closed by the safety door.

Typically, the closed position of a safety door is controlled by an RFID reading device in the safety switch reading the encoded signal of the transponder in the actuator.

In addition to this locking process, the actuator 2 is locked using the guard locking device 1 shown in FIG. 1.

The guard locking device 1 has a housing 3 for receiving its individual components. For implementing the locking, a guard locking element 4, embodied by a guard locking bolt in the present case, can be extended from an opening on the top of the housing 3, and inserted into a recess 5 on the bottom of the actuator 2.

In the lower area of housing 3 of the guard locking device 1, there is positioned an electric drive 6 having an electric motor 6a with a planetary gear train 6b. The current rotary position of the electric motor is detected by means of a rotary position transducer 7.

Electric drive 6 drives a spindle 8. The front end of spindle 8 is connected to a driver 9. The driver 9 is embodied as a hollow cylinder. The front end of spindle 8 protrudes beyond the underside of the driver 9 into the latter's interior and is positioned there by means of a spindle nut 10.

The guard locking element 4 is coupled to the upper end of driver 9 by means of a coupling 11.

A rotary motion of spindle 8 driven by electric drive 6 is converted by the coupling 11 and spindle nut 10 into a purely translatory motion of the guard locking element 4.

This coupling 11 has a cross pin 12 and a cylindrical pin 13 whose longitudinal axes are oriented perpendicular to each other and perpendicular to the longitudinal axes of the driver 9 and of the hollow-cylindrical guard locking element 4.

The longitudinal axes of the spindle 8, the driver 9 and the guard locking element 4 are oriented along the symmetry axes of the housing 3.

The cross pin 12 is guided in a longitudinal guide 14 embodied as an oblong hole in housing 3. The longitudinal axis of the oblong hole is oriented in the longitudinal direction of the housing 3.

Figure 2:
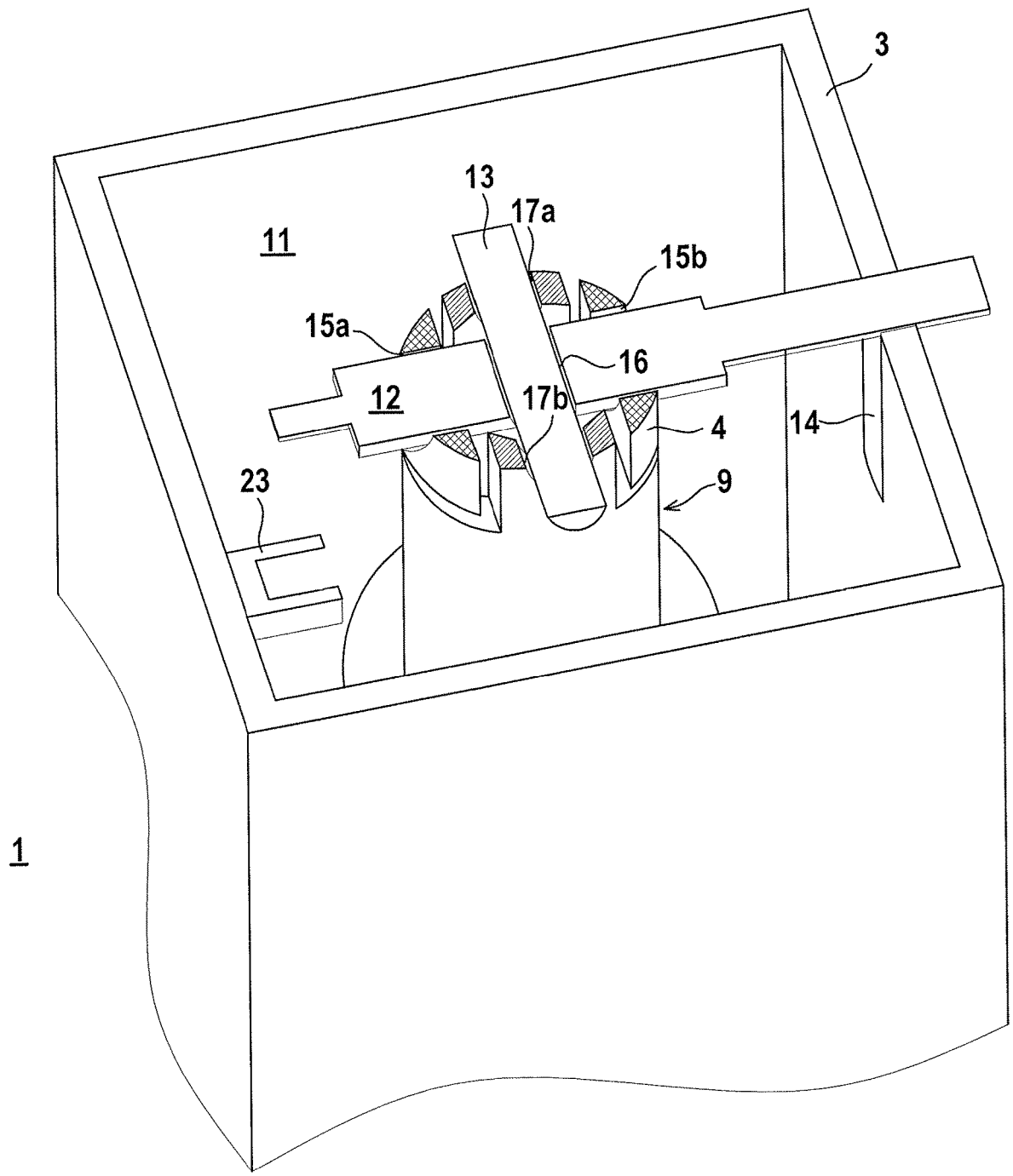
FIG. 2 Detail representation of the guard locking device pursuant to FIG. 1 with its coupling.
Figure 3:
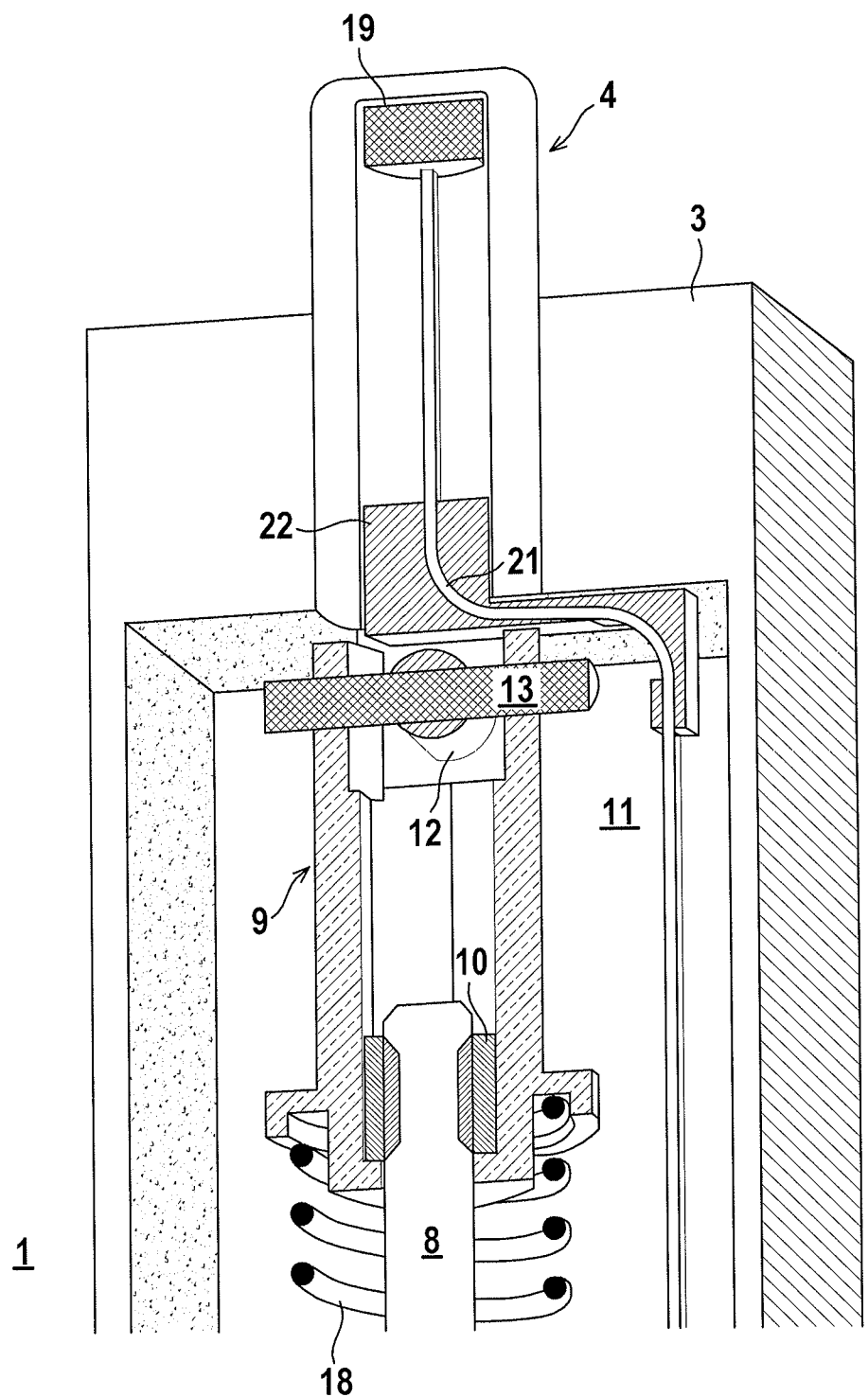
FIG. 3 Detail representation of the guard locking device pursuant to FIG. 1 with its guard locking element and a cable deflection device.

As FIGS. 2 and 3 show, the cross pin 12 is located with some play in recesses 15a, 15b of the wall of the guard locking element 4. The cylindrical pin 13 is located with some play in a recess 16 of the cross pin 12 and furthermore in recesses 17a, 17b in the wall of the driver 9, thus securing the cross pin 12. The coupling 11, which is thusly embodied, provides torsionally rigid and play-free coupling, in the axial direction, of the guard locking element 4 to the spindle 8, and thus to the electric drive 6, so that by means of the electric drive, exact stroke motions of the guard locking element 4 can be performed. The fact that cross pin 12 is guided in the longitudinal guide 14 guarantees that the rotary motion of the electric drive 6 is converted into a purely translatory motion of the driver 9, and thus of the guard locking element 4. The fact that the cross pin 12 and the cylindrical pin 13 are seated with play in the plane oriented perpendicular to the longitudinal axis of the guard locking element 4 effects a lateral tolerance compensation, i.e. component tolerances are taken into account, so that they do not impair the guiding of the guard locking element 4.

As can further be seen from FIG. 1, a spring 18 generating a spring force oriented in the axial direction is arranged between the bottom of the driver 9 and the top of the electric drive 6.

FIGS. 1 and 3 show the guard locking element 4 in its blocking position, in which it is extended beyond the top of housing 3. The actuating motion required for this is effected by the electric drive 6. Here, as FIGS. 1 and 3 show further, the top end of the spindle 8 with the spindle nut 10 is situated in the lower area of the interior of the hollow-cylindrical driver 9. This interior forms a decoupling path, and thus a means of decoupling for the guard locking element 4. The decoupling path allows mechanical release of the guard locking element 4, decoupled from the electric drive 6. This is because the guard locking element 4 can be brought, purely mechanically and decoupled from the electric drive 6, from its blocking position into its release position, in which the guard locking element 4 is completely retracted into the housing 3, because the spindle nut 10 can move along the decoupling path when a pressure force is exerted from above on the guard locking element 4. Thus, the guard locking element 4 is moved from its blocking position to its release position independently of the electric drive 6 and against the spring force of spring 18. This can be used for escape release of the guard locking device 1.

As FIG. 1 shows, a sensing means 19 is located in the upper area of the interior of the hollow-cylindrical guard locking element 4. A corresponding sensing means 20 is located inside the actuator 2. When the guard locking element 4 is inserted into the recess 5 of the actuator 2 for the purpose of guard locking actuator 2, the sensing means 19, 20 generate a corresponding signal. Thus, the guard locking is controlled by means of these sensing means 19, 20. The sensing means 19, 20 can, for example, be embodied as a proximity switch or an RFID system.

The sensing means 19 is connected to electronics on the electric drive 6 by means of a cable 21. As FIG. 3 in particular shows, starting from the sensing means 19, the cable 21 runs in the vertical direction in the interior of the guard locking element 4. Then the cable 21 is guided in a cable deflection device 22. The cable deflection device 22 forms a positive guide for the cable 21 by deflecting it twice by 90°. What is essential here is that the cable 21 is deflected in the cable deflection device 22 with relatively large radii of curvature and is positively guided with little play in the process so that kinking or other damage to the cable 21 is prevented. The cable 21 emerging from the cable deflection device 22 then runs in the vertical direction to the electronics, where it is connected to the latter. What is essential here is that the cable 21 runs at a distance from the components of the guard locking device 1 so that even when the guard locking element 4 moves, kinking or pinching of the cable 21 is prevented.

The guard locking element 4 can be moved by means of the electric drive 6 between the blocking position and the release position, with these positions being preset by end stops (not shown). Here, the actuating motions of the guard locking element 4 are sensor-controlled. Advantageously, in the guard locking device a suitable sensing system is provided for this purpose. In the simplest case it can be embodied by a single sensor element 23. Sensor element 23 is used to detect the lower end position of the guard locking element 4. If the spindle nut 10 is moved to its lower end position, the latter will be determined indirectly by sensor element 23 by detecting the lower end position of the guard locking element 4. This lower end position serves as a reference position. Starting from this, the rotary position transducer 7 of the electric drive 6 detects the relative positions of the spindle nut 10 relative to the reference position. Thus, only a single sensor element 23 is needed in the guard locking device 1.

Using the guard locking device 1 pursuant to FIG. 1, bistable guard locking as well as a capture function can be realized for performing the guard locking. The guard locking device 1 can optionally be operated with bistable guard locking or a capture function. The selection can be implemented by the manufacturer by means of a suitable software variant. Alternatively, the selection can be made by an authorized person entering a programming command into the control unit of the guard locking device 1.

FIGS. 4a-c show the sequence of a bistable guard locking completely controlled by the electric drive 6.

As can be seen from FIG. 1 and also from FIGS. 4a-c, the actuator 2 has a slanted area 2a as an engagement element at its front end. This engagement element is not necessary for the bistable guard locking.

FIG. 4a shows the starting state when the actuator 2 is not yet in the range of the guard locking device 1. The guard locking element 4 is retracted into its release position by means of the electric drive so that the guard locking element can be completely retracted into the housing 3 of the guard locking device 1. Now the actuator 2 can, by swiveling or sliding the safety door, be brought into the range of the guard locking device 1, which is the case when the safety door is in its closed position and the actuator 2 is locked in the safety switch. This is shown in FIG. 4b.

Now the guard locking element 4 can be extended into its blocked position by means of electric drive 6 so that actuator 2 protrudes into the seat of the actuator 2 (FIG. 4c), whereby guard locking of the actuator 2 is effected.

The guard locking can then be released again by moving the guard locking element 4 into the release position by means of the electric drive 6.

FIGS. 5a-5c show the sequence for the capture function.

The starting state (FIG. 5a), in which the actuator 2 is not yet in the range of the guard locking device 1, is now such that the guard locking element 4 is already moved into the blocking position by means of the electric drive 6.

Now, when the actuator 2 is moved into the range of the guard locking device 1, the actuator 2 is guided against the guard locking element 4 with the slanted surface 2a (FIG. 5b). Due to the decoupling means of the guard locking device 1, the guard locking element 4 can give way downwards, i.e. by means of the mechanical force exerted by the actuator 2 via the slanted surface 2a, the guard locking element 4 is decoupled from the electric drive 6 and pushed downwards into the release position against the spring force of spring 18.

If the actuator 2 is in its locking position, its recess 5 lies close above the guard locking element 4. Then, by means of the spring force of spring 18, the guard locking element 4 is moved into its blocking position in which the guard locking element engages with the recess 5 (FIG. 5c), i.e. the guard locking is decoupled from the electric drive 6.

Then, for releasing the guard locking, the guard locking element 4 is moved to the release position by means of the electric drive 6.

LIST OF REFERENCE NUMERALS (1) Guard locking device
(2) Actuator
(2a) Slanted surface
(3) Housing
(4) Guard locking element
(5) Recess
(6) Electric drive
(7) Rotary position transducer
(8) Spindle
(9) Driver
(10) Spindle nut
(11) Coupling
(12) Cross pin
(13) Cylindrical pin
(14) Longitudinal guide
(15a, 15b) Recesses
(16) Recess
(17a, 17b) Recesses
(18) Spring
(19) Sensing means
(20) Sensing means
(21) Cable
(22) Cable deflection device
(23) Sensor element

The invention claimed is:

1. A guard locking device having a guard locking element operable by an electric drive, wherein the guard locking element is brought into a blocking position by the electric drive such that an actuator of a safety switch is locked by said guard locking element, wherein the guard locking element is connected to the electric drive via a coupling such that a rotary motion of the electric drive is converted into a purely translatory motion of the guard locking element wherein the coupling has a cross pin and a cylindrical pin running perpendicular to the cross pin, with the cross pin being guided in a longitudinal guide and with the cylindrical pin securing the cross pin to the guard locking element.

2. The guard locking device according to claim 1, wherein when in the blocking position, the guard locking element engages with a recess of the actuator, thereby locking the actuator, and wherein the guard locking element is moved out of the blocking position by the electric drive.

3. The guard locking device according to claim 1, wherein said guard locking device has means of decoupling via which the guard locking element, while decoupled from the electric drive, is moved out of the blocking position against a spring force.

4. The guard locking device according to claim 3, wherein a capture function is realizable for the actuator via the means of decoupling.

5. The guard locking device according to claim 4, wherein the capture function is realized by an engagement element of the actuator cooperating with the guard locking element such that said guard locking element is mechanically decoupled from the electric drive, so as to be moved out of the blocking position, such that when a recess of the actuator lies in an area of the guard locking element, the guard locking element is moved back into the blocking position by the spring force and engages in the recess of the actuator, thereby locking the actuator.

6. The guard locking device according to claim 3, wherein the guard locking device is operable optionally with a bistable guard locking or a capture function.

7. The guard locking device according to claim 6, wherein the functionality of the bistable guard locking or of the capture function is defined by a software version of the guard locking device or is specified by a programming command.

8. The guard locking device according to claim 1, wherein with the coupling between the guard locking element and the electric drive, a torsionally rigid and play-free coupling is effected in an axial direction, and a tolerance compensation of these units is effected in a lateral direction.

9. The guard locking device according to claim 8, wherein longitudinal axes of the cross pin and the cylindrical pin run perpendicular to a longitudinal axis of the guard locking element, with the cross pin being positioned with play in at least one recess of the guard locking element, and with the cylindrical pin being positioned with play in a recess of the cross pin.

10. The guard locking device according to claim 1, wherein the electric drive has an electric motor having a planetary gear train and on an output side of the electric drive, a spindle is provided whose rotary motion is converted as forward motion to a driver coupled to the spindle by a spindle nut, the driver is connected to the guard locking element via the coupling.

11. The guard locking device according to claim 10, wherein the driver is connected to the coupling by a cylindrical pin and is thus positioned in a torsionally rigid manner.

12. The guard locking device according to claim 10, wherein a spring generating a spring force is positioned between the driver and the electric drive.

13. The guard locking device according to claim 1, wherein a cable is guided within the guard locking element by a cable deflection device being arranged on the guard locking element so as to guide the cable along a trajectory.

14. The guard locking device according to claim 13, wherein the cable emerging at the cable deflection device is guided laterally next to components of the guard locking device.

15. The guard locking device according to claim 1, wherein the guard locking element (4) is brought into a lower end position, which corresponds to a release position, the lower end position is controlled by sensors, thereby defining a lower position of a spindle nut, and additional positions of the spindle nut are determined by a rotational position transducer of the electric drive.

16. A guard locking device pursuant to claim having a guard locking element operable by means of an electric drive, wherein the guard locking element is brought into a blocking position by the electric drive such that an actuator of a safety switch is locked by said guard locking element, wherein the guard locking element is connected to the electric drive via a coupling such that a rotary motion of the electric drive is converted into a purely translatory motion of the guard locking element, wherein the electric drive has an electric motor having a planetary gear train and on an output side of the electric drive, a spindle is provided whose rotary motion is converted as forward motion to a driver coupled to the spindle by a spindle nut, the driver is connected to the guard locking element via the coupling, wherein the driver is embodied as a hollow cylinder, with an interior space of the driver embodying a decoupling path as an integral part of a means of decoupling, with the spindle being guidable along the decoupling path.

* * * * *